ND

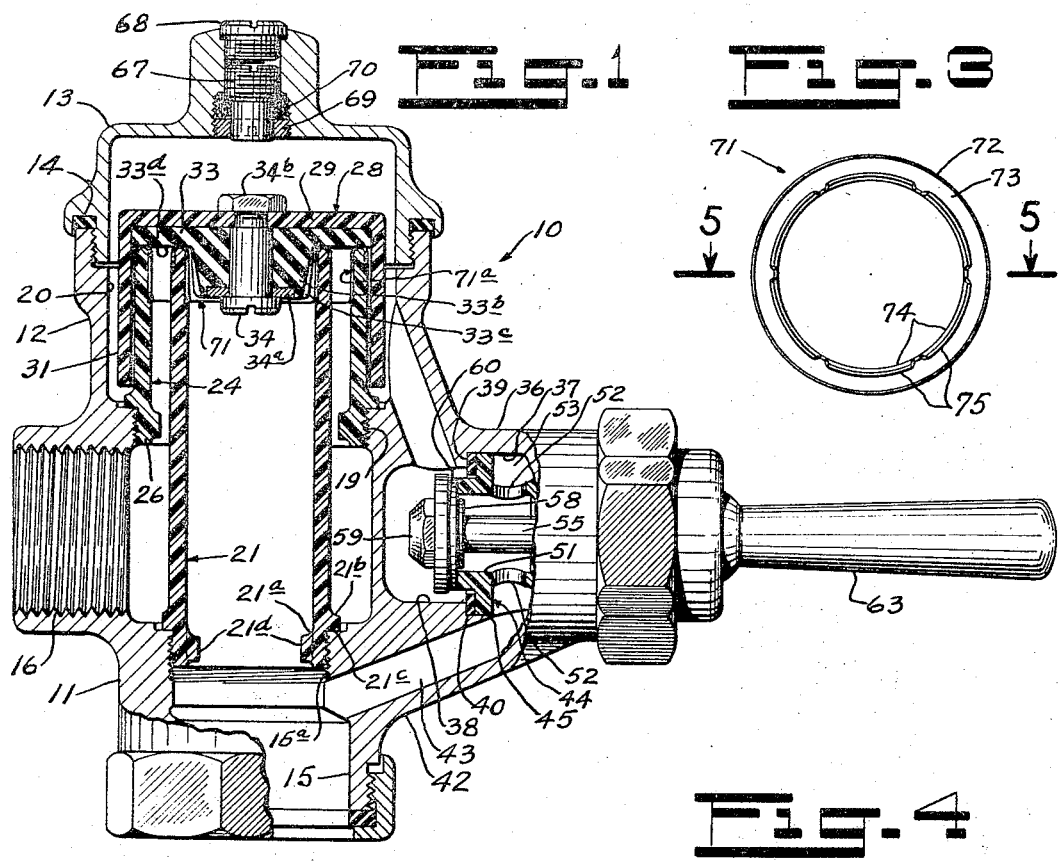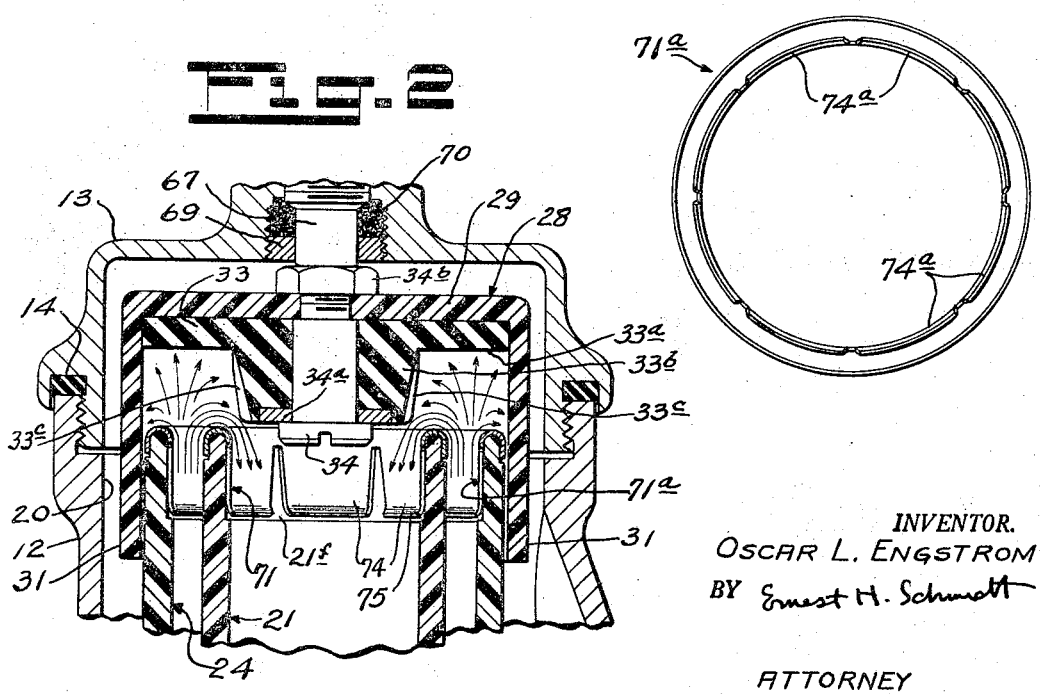

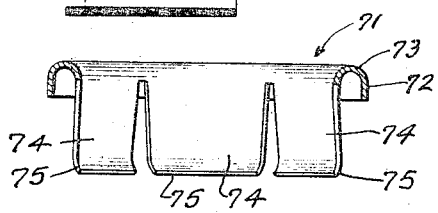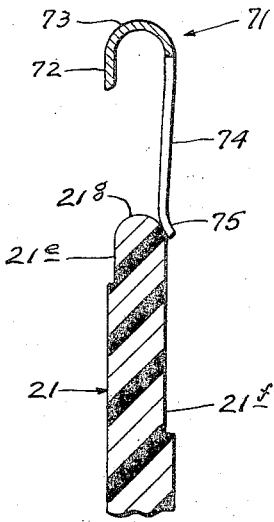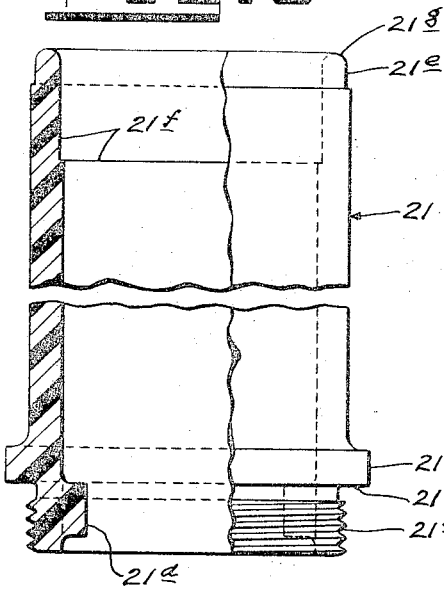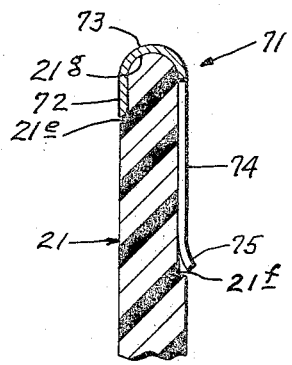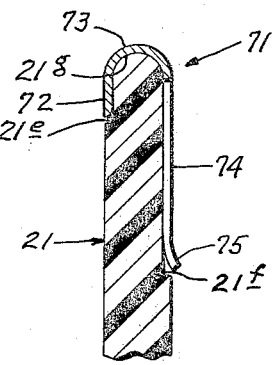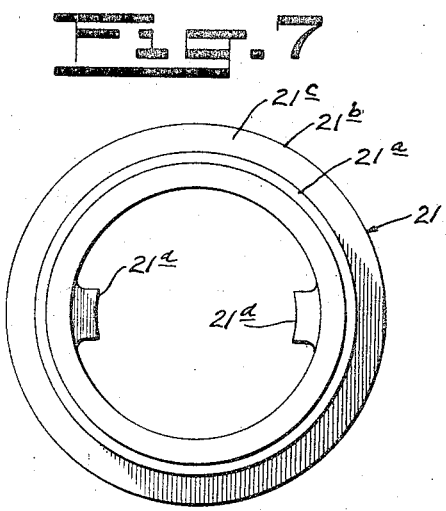

United States Patent Office 3,347,519
Patented Oct. 17, 1967

3,347,519
REPLACEABLE VALVE SEAT FOR
FLUSH VALVES
Oscar L. Engstrom, 45—54 41st St.,
Long Island City, N.Y. 11104
Filed Apr. 12, 1965, Ser. No. 447,354
7 Claims. (Cl. 251—365)

ABSTRACT OF THE DISCLOSURE

A replaceable valve seat for flush valves or flushometers of the type having a valve head member in the form of an inverted cylindrical cup loosely arranged above a main valve seat within the valve body, the valve seat being comprised of a pair of concentric annular surfaces defined by one end each of a pair of coaxial tubes, the other end of the center tube of which extends to the outlet of the valve, and the annular space above the main valve head member communicating with the water inlet pressure, whereby the difference in water pressure acting from below and above the main valve head member serves to forceably set the valve head member against the valve seat. The replaceable valve seat embodying the invention is ring-shaped and of a cross-sectional shape defining a short, outer cylindrical lip portion adapted to fit about the outer peripheral margin of a tubular valve member, and a plurality of comparatively long, resiliently tongue portions, in substantially spaced parallel disposition with respect to the lip portion and adapted to resiliently engaged inner wall portions of a tubular valve member for frictionally holding itself in place.

In United States Patent Number 3,166,289 issued to me on Jan. 19, 1965, there is disclosed an improved flush valve or flushometer construction among the salient features of which are its freedom from "water hammer" upon shut-off, its anti-syphonic action, its large and unrestricted outlet waterway, and the lack of springs, diaphragms and sliding pistons in its operating mechanism. The structure is characterized by a valve head member in the form of an inverted cylindrical cup loosely arranged above a main valve seat within the valve body, the valve seat being comprised of a pair of concentric annular surfaces defined by one end each of a pair of coaxial tubes, the other end of the center tube of which extends to the outlet of the valve, and the annular space between the tubes and the space above the main valve head member communicating with the water inlet pressure, whereby the difference in water pressure acting from below and above the main valve head member serves to forcefully seat the valve head member against the valve seat.

It has been found that after long periods of use the water or other liquid flushed or metered out by valves of the character above described will, in passing over the annular surfaces comprising the valve seat, result in erosion and or corrosion crevices being formed therein, to a degree depending upon the chemical and impurity content of the liquid, which crevices sooner or later result in such leakage or other malfunction of the valve as to necessitate its reconditioning. Heretofore, reconditioning was effected by replacing the valve seat tubes or equivalent valve seat body members, or removing these parts and machining them again at their valve seat surfaces. These methods of reconditioning are deficient not only in that they are costly, but also in that they require special tools for removal and replacement of the parts.

It is accordingly the principal object of this invention to provide a replaceable valve seat for tubular valve members which is inexpensive to produce and which can easily be removed and replaced without the use of tools for quickly and inexpensively restoring a valve to perfect operating condition.

It is another object to provide a replaceable valve seat for flush valves of the character described wherein the concentric tube members the annular ends of which support the replaceable seats, and the valve head member, are fabricated of a tough, chemically-inert, synthetic plastic material rather than of metal, thereby increasing resistance to erosion and corrosion and at the same time decreasing over-all weight and cost of the flush valve unit.

It is a more particular object of my invention to provide a replaceable valve seat for tubular valve seat members, whether of metal or of a synthetic plastic, that is ring-shaped and of a cross-sectional shape defining a short, outer cylindrical lip portion adapted to fit about the outer peripheral margin of a tubular valve member, and a plurality of comparatively long, resilient tongue portions, in substantially spaced, parallel disposition with respect to said lip portion and adapted to resiliently engage peripheral inner wall portions of the tubular valve member for frictionally holding itself in place.

Other objects, features and advantages of the invention will be apparent from the following description when read with reference to the accompanying drawings. In the drawings, wherein like reference numerals denote corresponding parts throughout the several views:

FIG. 1 is an elevational view, partly in cross-section, of a water closet flush valve embodying the invention;

FIG. 2 is an enlarged, partial, vertical cross-sectional view illustrating the valve head member in its uppermost position and, by the arrows, the path of water flow over the replaceable valve seats;

FIG. 3 is a bottom view of the inner replaceable valve seat, shown separately and in the same scale as in FIG. 2;

FIG. 4 is a bottom view of the outer replaceable valve seat, shown separately and in the same scale as in FIG. 2;

FIG. 5 is a vertical cross-sectional view of the inner replaceable valve seat, taken along the line 5—5 of FIG. 3 in the direction of the arrows;

FIG. 6 is a vertical view, partly in section, of the valve seat member inner tube, shown separately and on an enlarged scale;

FIG. 7 is a bottom view of the valve seat member tube shown in FIG. 6, illustrating the tool-engaging lugs for securing the tube in position;

FIG. 8 is a fragmentary, vertical cross-sectional view, greatly enlarged, illustrating the position of the replaceable valve seat on the valve seat member tube at the beginning of its placement thereon; and FIG. 9 is a view similar to that of FIG. 7, but showing the replaceable valve seat in fully on position.

Referring now in detail to the drawings, my improved flush valve, designated generally by the numeral 10, is comprised of a lower housing member 11 of cast metal having at its upper end an internally-threaded circular wall portion 12 to which an upper dome or housing member 13 is removably secured. A circular rubber gasket 14 serves to hermetically seal the junction between the lower and upper housing members 11 and 13. The lower housing 11 is formed at its lower end with an outlet opening 15 and an internally-threaded side inlet opening 16. The outlet opening 15 extends upwardly into a reduced-diameter, internally-threaded portion 15a threadedly received within which is the externally-threaded lower end portion 21a of a cylindrical outlet tube 21. A cylindrical inlet tube 24 of greater diameter than the outlet tube 21 is screwed at its lower end within an internally-threaded bore 19 in the lower housing member 11, said cylindrical inlet tube having for this purpose an externally-threaded end portion 26. The bore 19 communicates at its upper end with a coaxial cylindrical bore 20 of increased diameter. The upper end of the inlet tube 24 preferably extends slightly short of the upper end of the outlet tube 21, and said upper ends together form annular seats received upon which are the replaceable valve seat members comprising the invention, as is hereinbelow more fully described. It will be apparent that the water inlet opening 16 is in direct communication with the annular space between the cylindrical water outlet and inlet tubes 21 and 24, respectively.

Referring now to FIGS. 6 and 7, which illustrate, separately, outlet tube 21, the same is preferably formed of a tough, chemically-inert synthetic plastic material, and is provided, just above the externally-threaded lower end portion 21a thereof, with an annular flange portion 21b, defining a downwardly-facing annular shoulder 21c serving as an abutment when the tube is threaded into seating engagement within the internally-threaded portion 15a of the outlet opening 15, as described above. The inner wall at the lower end of the outlet tube 21 is formed with a pair of diametrically opposed projections or lugs 21d for engagement with a simple tool used in threading the tube in place in the lower housing member 11.

A marginal upper end portion of the outer wall of the tube 21 is of reduced diameter to provide a short, external, annular recess 21e. A marginal upper end portion of the inner wall of the tube 21 is of increased internal diameter to provide a relatively long internal annular recess 21f. The upper extremity of the tube 21 is semi-circularly rounded, as indicated at 21g. The inlet tube 24, except for being shorter and of greater diameter, is otherwise identical in structure with the above described outlet tube.

Referring now to FIGS. 3 and 5, the ring-shaped inner replaceable valve seat 71 illustrated separately therein is preferably fabricated, as by stamping, of a chemically resistant, tough metal, such as stainless steel, and is integrally formed with a short, circular outer skirt portion 72 which merges at its upper end into an inwardly and downwardly directed seat portion 73 of semi-circular cross-sectional shape which, in turn, merges into a plurality (six in the embodiment illustrated) of downwardly directed, resilient tongues 74 outer end portions of which are bent inwardly as indicated at 75. The resilient tongues 74 are sprung slightly in the direction of the skirt portion 72 of the replaceable valve seat 71, as can be seen in FIG. 8. As illustrated in FIGS. 8 and 9, the dimensions of the replaceable valve seat are such as to substantially fill the voids defined by the annular recesses 21e and 21f in the tube 21 after being pushed thereon from the position as shown in FIG. 8 to the position of FIG. 9 against the reactive force of the resilient tongues 74, which tongues serve to hold the replaceable valve seat 71 securely in position until such time as replacement becomes necessary, at which time they can readily be removed by pulling with the fingers from the inside of the tube without resort to tools for this purpose.

The replaceable valve seat 71a illustrated in FIG. 4 differs from that of FIGS. 5, 8 and 9 described above only in that it is of greater diameter to fit on the inlet tube 24, and, being of greater diameter, is preferably formed with a greater number, eight in the embodiment illustrated, of resilient tongues 74a.

A main valve cap member 28 is disposed in coaxial relation with the upper ends of the outlet and inlet tubes 21 and 24, respectively, said valve cap member comprising a circular disc portion 29 integrally formed with a downwardly-extending cylindrical sleeve portion 31. The cylindrical sleeve portion 31 coaxially surrounds the inlet tube 24 in spaced relation. A circular neoprene washer 33 is seated against the underside of the circular disc portion 29 of the valve cup member 28 and secured thereat by a flat-headed machine screw 34b extending from above through said circular disc portion, a central opening in said circular neoprene washer, and a metal washer 34a, and held in place at the inside of said cup valve member by a sleeve nut 34. It is to be noted that the water inlet opening 16 is in communication with the interior of the opening 16 is in communication with the interior of the upper housing member 13 through the valve seat when open by virtue of the spacing between the main valve cap member 28 and said upper housing member (see FIG. 2). The washer 33 has a flat peripheral portion 33a, integrally formed with a central tapered portion 33b in the form of a truncated cone. The periphery of the tapered portion 33b is provided with a plurality, four in the embodiment illustrated, of equidistantly spaced slots or flutes 33c, for the purpose hereinafter appearing.

The lower housing member 11 is formed with a sidewardly-extending cylindrical housing portion 36 having a lateral bore 37 which, at its inner end, communicates with a concentric bore 38 of decreased diameter opening into the vertical bore 20 in said lower housing member. The lower housing member 11 is also formed with a pressure release passageway 43 provided in a boss 42 extending at an angle between the lower part of the cylindrical housing portion 36 and the upper portion of the outlet opening 15 of the housing member 11, said passageway communicating between the inner end of the bore 37 and the cylindrical housing portion 36 and the outlet opening 15. The transition zone between the bores 37 and 38 provides an annular shoulder 39 against which an annular gasket 40 is seated and affixed.

Fitted within the bore 37 of the housing portion 36 is a relief valve body member 44 having at its inner end an annular portion 45 firmly seated in sealing engagement against the gasket 40. The inner end of the relief valve body member 44 is formed with an axial bore 51 the side wall of which is provided with a plurality of radial openings 52 communicating with a centrally located peripheral recess 53. The peripheral recess 53 communicates with the upper end of the pressure release passageway 43 in the boss 42.

Slidably arranged in a central bore in the relief valve body member 44 is an actuating rod 55. The inner end of the actuating rod 55 is threaded and has secured thereon, between a metal washer 58 and a nut 59, a resilient washer 60 normally seated against the inner end of the relief valve body member 44.

In operation, momentary sideward pushing of the handle lever 63, through cam mechanism not illustrated, will result in inward movement of the actuating rod, thus unseating its washer 60 and allowing water under pressure within the upper housing member 13 to be instantly released through the axial bore 51, the openings 52 and the peripheral recess 53 in the relief valve body member 44, and the pressure release passageway 43 in the boss 42. Thus, instantaneous release of pressure and opening of a large discharge passageway to the outlet opening 15 will cause the valve cap member 28 to rise practically instantaneously to its full extent within the housing member 13 under the force of inlet water under pressure emerging from the annular space between the outlet and inlet tubes 21 and 24, respectively, (see flow pressure arrows, FIG. 2) thereby initiating flushing action through the large unrestricted water discharge passageway afforded by the outlet tube 21. During the flushing cycle a portion of the water will pass through the space between the outer surface of the inlet tube 24 and the inner surface of the sleeve portion 31 of the valve cap member 28, and around said main valve cap member to enter the space above and gradually again increase the water pressure above said cap member, finally forcing it down again against the valve seat formed by the upper end of the outlet tube 21 where it will become firmly seated by the time inlet pipe water pressure is reached above said cap member to terminate the flushing cycle.

The washer 33 is of neoprene rubber and of sufficient thickness to give it the resiliency required for a cushioning effect and to render complete sealing of water flow at the upper ends of the two tubes 21 and 24, as illustrated in FIG. 1.

Referring to FIG. 2, it will be seen that after the pressure release valve has opened, the water that has been under pressure on the top surface of the valve cap member 28 has been released and the water supply pressure, shown by the arrows, pushing upward under the neoprene washer, has forced the valve cap member upward. This action allows full water action downward through the outlet or inner tube 21, as indicated by the numerous arrows. At the same time some of the main line inlet water, as indicated by arrows, passes between the clearance of the valve cap member 28 and the inlet or outer tube 24. With the closing of the pressure release valve as shown in FIG. 1, the water seeping through this clearance starts building up a pressure upon the top surface of the valve cap member 28. When the valve cap member begins to move into seating engagement on the valve seat structure again, the amount of water flowing into the outlet or inner tube 21 will be restricted due to the truncated cone portion 33b of the neoprene washer having entered the top of the inner tube 21. The flutes 33c of the washer 33 allow enough water to pass during shut-off action to refill a bowl. The flutes 33c, being tapered outward at the bottom at an angle of approximately seven degrees further decrease the volume of flow gradually as the valve cap member descends into the position whereat the replaceable valve seat 71 of the inner tube 21 contacts the flat peripheral portion 33a of the washer 33, when the flow of water to said inner tube is completely cut off. This discontinues the flushing action, but the water pressure on top of the valve cap member 28 has not built up sufficiently to seat it over the inlet or outer tube 24, which is preferably a little shorter than the outlet or inner tube 21. As water continues to pass through the clearance between the outside surface of the sleeve portion 31 of the valve cap member 28, the pressure on top of said cap member continues to build up, forcing the cap downward until the neoprene washer 33 seals itself against the replaceable valve seat 71a of the inlet or outer tube 24 (see FIG. 1). With the parts in this position, the water pressure on top of the valve cap member 28 is such as to cause the top of the outlet or inner tube 21 to be embedded in the neoprene washer 33 creating a positive seal at this point.

The duration of the flushing cycle, which is determined to a great extent by the spacing between the outside of the inlet or outer tube 24 and the inside of the sleeve portion 31 of the valve cap member 28, can be adjusted by controlling the upward travel extent of said valve cap member by means of an adjustment screw 67 threaded in a central opening in a cylindrical boss formed in the top of the housing member 13. A cap screw 68 threads into the opening to normally cover the adjustment screw 67. Leakage of the water under pressure within the housing member 13 is prevented by packing 70 held in place by a retainer 69.

While I have described and illustrated preferred embodiments of my invention, it is to be understood that this disclosure is for the purpose of illustration only, and that various omissions, or changes in arrangement of parts, as well as the substitutions of equivalent elements for those herein shown and described, can be made without departing from the spirit and scope of the invention as defined in the following claims. For example, the ring-shaped replaceable valve seats herein described and illustrated as having their cylindrical skirt portions at the outside and their resilient tongue portions at the inside could alternatively have their skirt portions at the inside and tongue portions at the outside. It has been found in practice, however, that if the tongue portions are at the inside, their in-turned lower ends within the outlet tube have the effect of quieting the rush of water therethrough to enhance the quietness of operation of flush valves of the type herein described as well as in other flow control valves or metering devices having intermittent heavy flow through tubular outlet conduits.

What I claim as new and desire to obtain by Letters Patent is:

1. A replaceable valve seat for tubular valve seat members comprising, in combination, a ring-shaped body member of such axial cross-sectional shape as to define concentrically spaced outer and inner wall portions integrally formed at one end with a rounded annular seat portion, the outer one of said wall portions being in the form of a uniformly straight cylindrical skirt, the inner one of said wall portions being comparatively long and having longitudinal slots defining into a plurality of peripherally-spaced tongues, the terminal ends of said tongues being inwardly turned, said slots extending inwardly to positions laterally opposite said outer wall portion.

2. A replaceable valve seat for tubular members as defined in claim 1 wherein said valve seat body member is integrally formed of a resilient metal, and wherein said tongues are pre-stressed to converge slightly toward said one of said wall portions.

3. A tubular valve seat structure for flush valves and the like comprising a tubular valve body, one end of said valve body having a reduced diameter end portion in the outer wall defining an outer annular recess, said one end of said valve body having an increased diameter end portion in the inner wall defining an inner annular recess, a valve seat removably disposed over said one end of said valve body, said valve seat comprising a ring-shaped body member of such axial cross-sectional shape as to define concentrically spaced outer and inner wall portions integrally formed at one end with a rounded annular seat portion, one of said wall portions being in the form of a cylindrical skirt, and the other of said wall portions being comparatively long and peripherally divided into a plurality of separate tongues, said tongues having inwardly-turned end portions, said skirt being received in seating engagement in one of said annular valve body recesses, and said tongues being received in the other of said valve body recesses.

4. A tubular valve seat structure for flush valves and the like as defined in claim 3 wherein said tubular valve body is formed of a tough synthetic plastic material and wherein said valve seat body member is integrally formed of a resilient metal, and wherein said tongues are pre-stressed to converge slightly toward said one of said wall portions.

5. A tubular valve seat structure for flush valves and the like comprising a tubular valve body, one end of said valve body having a reduced diameter end portion in the outer wall defining an outer annular recess, said one end of said valve body having an increased diameter end portion in the inner wall defining an inner annular recess, a valve seat removably disposed over said one end of said valve body, said valve seat comprising a ring-shaped body member of such axial cross-sectional shape as to define concentrically spaced outer and inner wall portions integrally formed at one end with a rounded annular seat portion, the outer one of said wall portions being in the form of a cylindrical skirt, the inner one of said wall portions being comparatively long and peripherally divided into a plurality of separate tongues, the terminal ends of said tongues being inwardly turned, said skirt being received in seating engagement in the outer one of said annular valve body recesses, and said tongues being received in the inner one of said valve body recesses.

6. A tubular valve seat structure for flush valves and the like as defined in claim 5 wherein said tubular valve body is formed of a tough synthetic plastic material and wherein said valve seat body member is integrally formed of a resilient metal, and wherein said tongues are prestressed to converge slightly toward said one of said wall portions.

7. A tubular valve seat structure for flush valves and the like as defined in claim 6 wherein the other end of said valve body is externally-threaded and formed at the inside with opposed lugs for engagement with a tool for threading said valve body in place in a supporting structure.

References Cited

UNITED STATES PATENTS 3,166,289  1/1965  Engstrom _____ 251—35

FOREIGN PATENTS 949,732  2/1949  France.
858,055  12/1952  Germany.

M. CARY NELSON, *Primary Examiner.*

W. JOHNSON, A. ROSENTHAL, *Assistant Examiners.*